(12) United States Patent
Armitt et al.

(10) Patent No.: US 11,846,606 B2
(45) Date of Patent: Dec. 19, 2023

(54) TRANSDUCER ASSEMBLY

(71) Applicant: GB Inspection Systems Ltd, Staffordshire (GB)

(72) Inventors: Timothy James Armitt, Derbyshire (GB); Neil Dean Smith, Staffordshire (GB); Kam Tong Choong, Staffordshire (GB)

(73) Assignee: GB INSPECTION SYSTEMS LTD, Staffordshire (GB)

( * ) Notice: Subject to any disclaimer, the term of this patent is extended or adjusted under 35 U.S.C. 154(b) by 139 days.

(21) Appl. No.: 16/975,864

(22) PCT Filed: Feb. 26, 2019

(86) PCT No.: PCT/GB2019/050534
§ 371 (c)(1),
(2) Date: Aug. 26, 2020

(87) PCT Pub. No.: WO2019/162707
PCT Pub. Date: Aug. 29, 2019

(65) Prior Publication Data
US 2020/0408717 A1 Dec. 31, 2020

(30) Foreign Application Priority Data

Feb. 26, 2018 (GB) .................................. 1803062
May 25, 2018 (GB) .................................. 1808654

(51) Int. Cl.
*G01N 29/32* (2006.01)
*G01N 29/06* (2006.01)
(Continued)

(52) U.S. Cl.
CPC ........... *G01N 29/069* (2013.01); *G01N 29/07* (2013.01); *G01N 29/2437* (2013.01);
(Continued)

(58) Field of Classification Search
CPC .... G01N 29/069; G01N 29/07; G01N 29/437; G01N 29/2487; G01N 29/32;
(Continued)

(56) References Cited

U.S. PATENT DOCUMENTS 4,570,487 A 2/1986 Gruber
5,156,050 A 10/1992 Schmid et al.
(Continued)

FOREIGN PATENT DOCUMENTS

CN 205920095 U 2/2017
EP 3759477 A 1/2021
(Continued)

OTHER PUBLICATIONS

International Search Report and Written Opinion issued in related International Patent Application No. PCT/GB2019/050534 dated Jun. 7, 2019, 14 pages.

(Continued)

*Primary Examiner* — Jacques M Saint Surin
(74) *Attorney, Agent, or Firm* — Mark H. Whittenberger; Holland & Knight LLP

(57) ABSTRACT

A dual element time-of-flight diffraction (TOFD) transducer assembly (10) for use in detecting an anomaly (78) in a test piece (70), the transducer assembly (10) comprising: a first transducer element (35) a configured to transmit ultrasonic signals (85a) to the test piece (70), and a second transducer element (35b) configured to receive diffracted ultrasonic signals (85b) from the test piece, wherein the first and second transducer elements (35a, 35b) are housed within a common housing (15), the housing (15) also forming part of the transducer assembly (10).

24 Claims, 3 Drawing Sheets

(51) Int. Cl.
*G01N 29/07* (2006.01)
*G01N 29/24* (2006.01)
*G01N 29/26* (2006.01)

(52) U.S. Cl.
CPC ......... *G01N 29/2487* (2013.01); *G01N 29/32* (2013.01); *G01N 29/26* (2013.01); *G01N 2291/011* (2013.01); *G01N 2291/0234* (2013.01); *G01N 2291/0289* (2013.01); *G01N 2291/102* (2013.01); *G01N 2291/263* (2013.01)

(58) Field of Classification Search
CPC .............. G01N 29/043; G01N 29/26; G01N 2291/0234; G01N 2291/011; G01N 2291/102; G01N 2291/0289; G01N 2291/24; G01N 2291/263
USPC ....................................................... 73/598
See application file for complete search history.

(56) References Cited

U.S. PATENT DOCUMENTS

| | | | |
|---|---|---|---|
| 5,922,961 A | | 7/1999 | Hsu et al. |
| 6,514,618 B1* | | 2/2003 | McKeighen ............ B32B 27/38 367/176 |
| 7,255,007 B2* | | 8/2007 | Messer ................ G01N 29/043 73/622 |
| 8,265,886 B2* | | 9/2012 | Bisiaux .............. G01N 29/4445 73/644 |
| 8,365,603 B2* | | 2/2013 | Lesage .................. G01N 29/27 73/644 |
| 8,438,928 B2* | | 5/2013 | Frederick ............. G01N 29/262 73/644 |
| 11,169,119 B2* | | 11/2021 | Armitt ................. G01N 29/069 |
| 2005/0223807 A1 | | 10/2005 | Bardoux et al. |
| 2006/0130586 A1 | | 6/2006 | Messer et al. |
| 2007/0044559 A1* | | 3/2007 | Andrews ............ G01N 29/4427 73/584 |
| 2011/0203376 A1 | | 8/2011 | Smythe |
| 2015/0300897 A1 | | 10/2015 | Xu et al. |
| 2017/0059528 A1 | | 3/2017 | Seong et al. |
| 2019/0128851 A1* | | 5/2019 | Wells .................. G01N 29/043 |
| 2019/0128855 A1* | | 5/2019 | Barrett .................. G21C 17/01 |
| 2020/0292504 A1* | | 9/2020 | Heckel ................. G01N 29/07 |
| 2020/0408717 A1 | | 12/2020 | Armitt |

FOREIGN PATENT DOCUMENTS

| | | |
|---|---|---|
| EP | 3759477 A1 | 1/2021 |
| FR | 3011332 A1 | 4/2015 |
| GB | 2198532 A | 6/1988 |
| GB | 2413184 A | 10/2005 |
| JP | 2004053462 A | 2/2004 |
| JP | 2004170399 A | 6/2004 |
| JP | 2004191295 A1 | 7/2004 |
| WO | 2004065953 A1 | 8/2004 |
| WO | 2005121772 A1 | 12/2005 |
| WO | 2010047842 A1 | 4/2010 |
| WO | 2019162707 A1 | 8/2019 |

OTHER PUBLICATIONS

Great Britain Combined Search and Examination Report Issued in related Great Britain Patent Application No. GB1808654.06 dated Nov. 23, 2018, 8 pages.
Shan, M. et al., "Defect depth automation measurement based on image processing for tofd parallel scanning", Intelligent Control and Automation (WCICA), 2012 10th World Congress on, IEEE, Jul. 6, 2012, pp. 4180-4183.
Office Action issued in Canadian Patent Application No. 3,092,017 dated Sep. 8, 2021.
Office Action issued in GB Application No. 3,092,017 dated Jun. 23, 2022, with 3 pages.
Office Action issued in CA Application No. 3,092,017 dated Feb. 23, 2022, with 3 pages.
Examination Search Report and Innovation, Science and Economic Development Canada dated Dec. 16, 2022 in Application Serial No. 3,092,017; PCT No. GB2019050534.
European Patent Office dated Nov. 8, 2022 in Application Serial No. 19 715 184.8-1001; Ref. No. P4739EP/JSH.

* cited by examiner

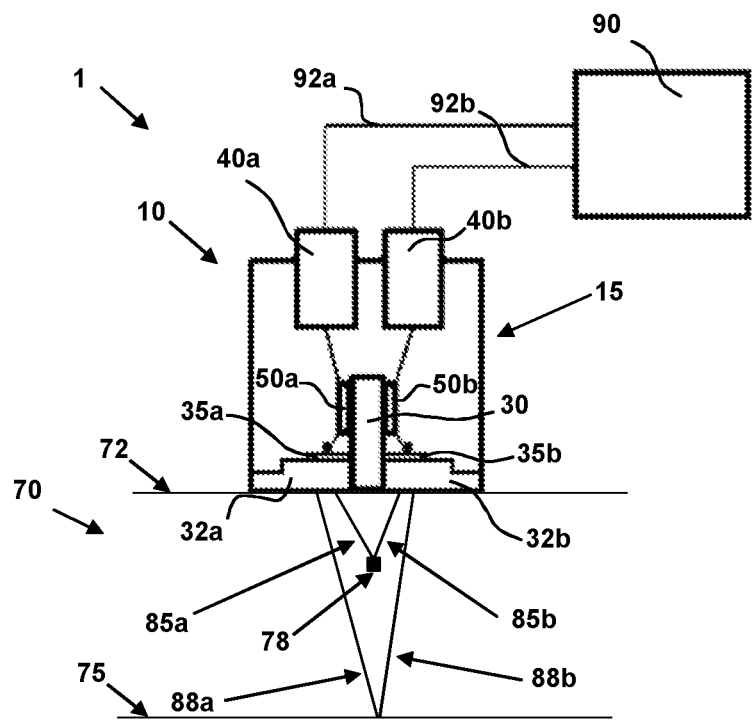
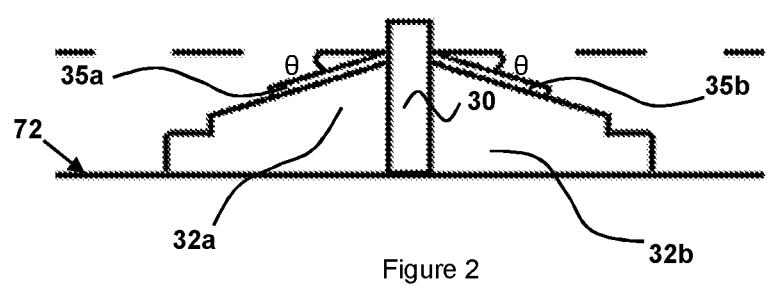
Figure 1
Figure 2

TRANSDUCER ASSEMBLY

CROSS-REFERENCE TO RELATED APPLICATIONS

The subject application is a U.S. National Stage application of International Application No. PCT/GB2019/050534, filed on Feb. 26, 2019, which claims the priority of Great Britain Patent Application No. 1803062.7, filed on Feb. 26, 2018, and also claims the priority of Great Britain Patent Application No. 1808654.6, filed on May 25, 2018. The contents of all applications are herein incorporated by reference in their entirety.

TECHNICAL FIELD

The present disclosure relates to a time-of-flight diffraction (TOFD) transducer assembly for use in detecting an anomaly in a test piece. Aspects of the invention relate to a transducer assembly and a TOFD system.

BACKGROUND

The Applicant has filed UK patent application GB1709625.6 which relates to a transducer assembly which makes use of time-of-flight diffraction (TOFD). Said assembly may be used to detect defects in weld joints between parts. Whilst providing many benefits, the transducer assembly in the aforementioned patent application is not always able to detect certain types of defect.

Other detection systems of the prior art are unable to reliably detect microscopic defects such as those that arise as a result of high temperature hydrogen attack (HTHA). HTHA is a problem which, for example, affects steels operating at elevated temperatures (typically above 400° C.) in hydrogen environments.

It is an aim of the present invention to address at least one of the above-stated disadvantages associated with the prior art.

SUMMARY OF THE INVENTION

According to an aspect of the present invention, there is provided a dual element time-of-flight diffraction (TOFD) transducer assembly for use in detecting an anomaly in a test piece, the transducer assembly comprising a first transducer element configured to transmit ultrasonic signals to the test piece, and a second transducer element configured to receive diffracted ultrasonic signals from the test piece, wherein the first and second transducer elements are housed within a common housing, the housing also forming part of the transducer assembly.

It is a benefit of the invention that a transducer assembly is provided which is capable of detecting microscopic defects, such as those that arise as a result of high temperature hydrogen attack (HTHA), using time-of-flight diffraction (TOFD) methods.

Currently there is no known means of detecting HTHA-induced defects using TOFD. The assembly may be a small and convenient unit which can access hard to reach locations, and may be replaced easily in the event of a fault arising. The transducer assembly is a highly-sensitive and high resolution ultrasonic probe with an adjustable focal depth which is configurable to detect microscopic defects at any useful depth in a test piece.

Typically, therefore, the transducer assembly may be used to detect a microscopic anomaly.

The transducer assembly may comprise transducer elements comprising the first and second transducer elements.

The first and second transducer elements may each be damped. The first and second transducer elements are each preferably heavily-damped.

The first and second transducer elements may each have a central frequency between approximately 5 MHz and 20 MHz.

The first and second transducer elements may have a maximum probe centre spacing (PCS) of approximately 50 mm.

Therefore, according to an aspect of the present invention, there is provided a dual element time-of-flight diffraction (TOFD) transducer assembly for use in detecting a microscopic anomaly in a test piece, the transducer assembly comprising transducer elements comprising a damped first transducer element having a central frequency between approximately 5 MHz and 20 MHz configured to transmit ultrasonic signals to the test piece, and a damped second transducer element having a central frequency between approximately 5 MHz and 20 MHz configured to receive diffracted ultrasonic signals from the test piece, wherein the first and second transducer elements are housed within a common housing and have a maximum probe centre spacing (PCS) of approximately 50 mm, the housing also forming part of the transducer assembly.

The transducer elements may comprise only the first transducer element and the second transducer element and no other transducer element. The first and second transducer elements may each have a preferred central frequency between 7 MHz and 15 MHz, and an optimal central frequency of 10 MHz.

The first and second transducer elements are heavily-damped.

The transducer assembly may further comprise a backing material adhered to each of the first and second transducer elements, the backing material being configured to damp the first and second transducer elements.

The backing material supporting the transducer element has a great influence on the damping characteristics of the transducer. Using a backing material with acoustic impedance similar to that of the active element will produce the most effective damping. Such a transducer will have a wider bandwidth resulting in higher sensitivity. As the mismatch in acoustic impedance between the active element and the backing material increases, material penetration increases but transducer sensitivity is reduced.

The backing material may be substantially made of a tungsten-loaded adhesive. Between approximately 70% and 90% of the backing material may be tungsten powder by weight. The backing material optimally comprises 1 part adhesive to 5 parts tungsten powder by weight. The backing material has a total mass between approximately 0.04 g and 0.06 g, and an optimal total mass of 0.0509 g (or 0.05 g).

The first and second transducer elements preferably have a PCS between approximately 5 mm and 50 mm. In some embodiments, the first and second transducer elements have a PCS between approximately 5 mm and 30 mm, or typically between approximately 5 mm and 15 mm. The first and second transducer elements have an optimal PCS between approximately 6 mm and 8 mm.

The transducer assembly may be configured with a focal depth of at least approximately 10 mm. Typically, the transducer assembly is configured with a focal depth of at least approximately 25 mm.

For example, the transducer assembly may be configured with an infinite focal depth.

The first and second transducer elements may each be arranged with a roof angle between approximately 0° and 10°. Typically, for example, the first and second transducer elements are arranged with a roof angle between approximately 0° and 7°. In certain embodiments, the first and second transducer elements are arranged with a roof angle between approximately 2.1° and 6°. In other embodiments, the first and second transducer elements are arranged with a roof angle of approximately 0°.

The transducer assembly may further comprise a first wedge portion and a second wedge portion for mounting the first and second transducer elements, respectively.

The first and second wedge portions may each have a thickness between approximately 3 mm and 8 mm, and optimally approximately 4 mm.

The first transducer element may be fixedly attached to the first wedge portion and the second transducer element may be fixedly attached to the second wedge portion by means of an adhesive.

The transducer assembly may further comprise a sound absorbing medium positioned between the first and second transducer elements, the sound absorbing medium sonically separating the first and second transducer elements.

The sound absorbing medium may also be positioned between the first and second wedge portions, the sound absorbing medium also sonically separating the first and second wedge portions.

The sound absorbing medium may be substantially made of cork.

The transducer assembly may further comprise an electrical connection means configured to electrically couple the first and second transducer elements to a flaw detector.

The transducer assembly may further comprise a couplant distribution means configured to distribute couplant on the test piece.

The transducer assembly may further comprise a traversing apparatus connection means configured to releasably attach the transducer assembly to a traversing apparatus.

The first and second transducer elements may each consist of a piezocomposite element.

The first and second transducer elements may each have a circular shape and have a diameter between approximately 4 mm and 8 mm, preferably approximately 6 mm.

In practice, the particular parameters of the transducer assembly, including the PCS and/or the central frequency and/or the degree of damping and/or the roof of the first and second transducer elements, will be selected according to the requirements for detection. For example, it may be that a particular user requires several transducer assemblies in order to provide a full range of detection possibilities, depending on the nature of the anomalies to be detected and on the depth at which it is expected the anomalies will be detected within the sample under test. To detect anomalies of one type at one depth, one particular set of parameters will be selected and to detect another type of anomaly at another depth a slightly different set of parameters will be selected. The parameters are selected from the above stated ranges and values, and the inventors have made the surprising discovering that selecting the parameters within the stated ranges, and at the typical values, provides a particularly useful detection assembly which can detect a nature of microscopic anomaly (e.g. HTHA) which cannot readily be detected, nor with such speed and ease, using conventional means.

It may be, therefore, that the transducer assembly forms one of a set of transducer assemblies, when sold, so as to provide the user with multiple detection possibilities.

In another aspect of the invention, a TOFD system comprises the transducer assembly described above and a flaw detector, wherein the flaw detector is coupled to the first and second transducer elements at the electrical connection means.

The flaw detector may be configured to: provide the transducer assembly with electrical drive signals for conversion by the transducer assembly into the ultrasonic signals to be transmitted to the test piece, receive electrical output signals derived from diffracted ultrasonic signals converted by the transducer assembly, analyse the received electrical output signals with respect to the electrical drive signals to determine the anomaly of the test piece, and output data relating to the anomaly of the test piece.

The invention extends to a method of detecting a microscopic anomaly in a test piece using the TOFD system described above; the method comprising the steps of: providing the TOFD system, arranging the transducer assembly of the TOFD system on the test piece above the anomaly, causing the flaw detector of the TOFD system to produce electrical drive signals and to provide the first transducer assembly with said electrical drive signals via the electrical connection means of the TOFD system, causing the transducer assembly to convert the electrical drive signals into ultrasonic signals and to transmit said ultrasonic signals into the test piece to diffract at the microscopic anomaly and propagate back towards the transducer assembly, causing the transducer assembly to convert diffracted ultrasonic signals into electrical output signals and to provide the flaw detector with said electrical output signals via the electrical connection means, causing the flaw detector to analyse the electrical output signals with respect to the electrical drive signals to determine the anomaly of the test piece, and causing the flaw detector to output data relating to the anomaly of the test piece.

Within the scope of this application it is expressly intended that the various aspects, embodiments, examples and alternatives set out in the preceding paragraphs, in the description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which:

FIG. 1 is a schematic view of a transducer assembly on a test piece comprising a defect, the transducer assembly being coupled to a flaw detector;

FIG. 2 is an exaggerated, schematic view of first and second wedge portions forming part of the transducer assembly in FIG. 1;

DETAILED DESCRIPTION

Figure 3:
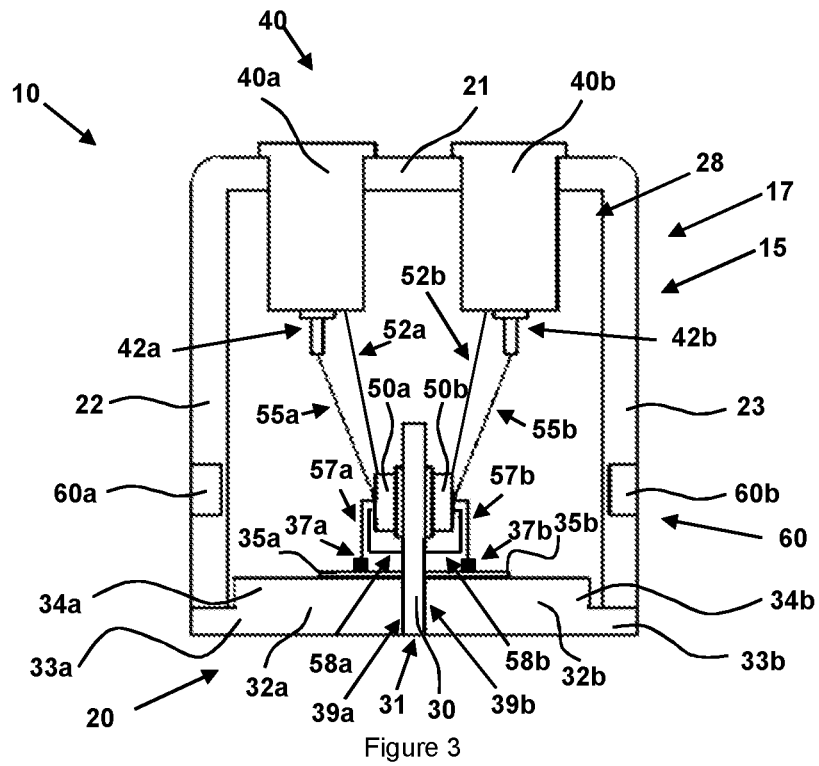
FIG. 3 is a cross-sectional view of the transducer assembly in FIG. 1.

Time-of-flight Diffraction (TOFD) is a non-destructive testing technique that uses diffraction of transmitted ultrasonic signals to identify the presence of anomalies in an article.

FIG. 1 shows a transducer assembly 10, or probe, positioned on a first surface 72 of a test piece 70 such as a pipe or plate. The test piece 70 is substantially made of steel. The test piece 70 comprises a microscopic anomaly 78, typically smaller than 50 µm, located between the first surface 72 and a second surface 75 of the test piece 70. The microscopic anomaly 78 is a defect such as a crack or fissure (or micro-fissure) which may have arisen as a result of High Temperature Hydrogen Attack (HTHA), or even creep. If left untreated, such microscopic anomalies 78 can lead to a destructive end of such a pipe or plate. For the purpose of this specification, reference to a microscopic defect is intended to refer to an undesirable anomaly of a particularly small size, and is not intended to include a crystallite or grain that is formed during the production of the test piece 70.

The transducer assembly 10 is configured to transmit consecutive ultrasound signals 85a into the test piece 70. In doing so, the transducer assembly 10 spreads ultrasound signals over a wide area that includes the microscopic defect 78. Unlike other detection techniques, the TOFD transducer assembly 10 does not focus signals 85a on one particular location. As some of the transmitted ultrasound signals 85a have sufficiently high frequencies, they diffract at the microscopic defect 78 in the test piece 70 and propagate back towards the transducer assembly 10. The transducer assembly 10 is further configured to receive the diffracted ultrasound signals 85b from the test piece 70, thereby allowing the microscopic defect 78 to be detected.

To this end, the transducer assembly 10 comprises transducer elements 35a, 35b consisting of a first transducer element 35a and a second transducer element 35b. That is, the transducer assembly 10 has only two transducer elements (i.e. it is a dual-element transducer assembly 10), in contrast to phased-array transducers. The first and second transducer elements 35a, 35b are configured to convert electrical signals into ultrasonic signals, and vice versa. On receipt of an electrical drive signal, the first transducer element 35a transmits an ultrasonic signal 85a into the test piece 70. On receipt of an ultrasonic signal 85b from the test piece 70, the second transducer element 35b produces an electrical output signal.

In practice, the first and second transducer elements 35a, 35b are the same, with any one being configured as a transmitter transducer and the other being configured as a receiver transducer. Whether the first and second transducer elements 35a, 35b act as a transmitter or receiver depends only on the connection of the transducer 10 to a flaw detector 90, and how the transducer elements 35a, 35b are driven.

Since the transducer assembly 10 has only two transducer elements 35a, 35b, the transducer assembly 10 is simple, cheap-to-produce and easily-replaceable. Moreover, since there are only two transducer elements 35a, 35b, the transducer assembly 10 is operable to detect defects much quicker than other transducer modules that include a plurality of transducer elements, such as phased array probes, which require more complex control processes and more detailed data processing.

Only transmitted ultrasound signals 85a with sufficiently high frequencies diffract at the microscopic defect 78 in the test piece 70. However, the higher the frequencies of the transmitted ultrasound signals 85a, the quicker the ultrasound signals are likely to attenuate in the test piece 10.

To combat the effects of attenuation, the transducer elements 35a, 35b of transducer assembly 10 are configured to transmit ultrasound signals 85a with a large proportion of sufficiently high frequencies and are arranged close together. To this end, the transducer elements 35a, 35b are heavily-damped and are housed within a common housing, as will now be detailed.

To heavily-dampen the first and second transducer elements 35a, 35b, a backing material 37a, 37b which may be made of a tungsten-loaded adhesive is adhered to each of the first and second transducer elements, 35a, 35b respectively. The backing material may be an adhesive material which is loaded with a damping material, for example a tungsten-loaded adhesive. A tungsten-loaded adhesive comprises an adhesive (such as Araldite®) and tungsten. The adhesive is "tungsten-loaded" because it comprises a high proportion of adhesive. Between approximately 70% and 90% of the backing material may be tungsten powder by weight. The backing material 37a, 37b optimally comprises 1 part adhesive to 5 parts tungsten powder by weight. The mass of the backing material 37a, 37b may be between approximately 0.04 g and 0.06 g, and optimally 0.0509 g (or 0.05 g). The above values are considered optimal because the first and second transducer elements 35a, 35b are sufficiently heavily-damped to transmit the necessary ultrasound signals 85a, but are not so damped that they cannot vibrate and hence transmit ultrasound signals 85a at all.

As a result, the first transducer element 35a transmits ultrasound signals 85a into the test piece with a wide range of frequencies with pulse lengths between approximately 0.4 µs and 1 µs (indicating how high the level of damping is). Moreover, an extremely wide bandwidth is achieved. A large proportion of these transmitted ultrasound signals 85a therefore have high enough frequencies that they will diffract at the microscopic defect 78 in the test piece 70. The larger the proportion of the transmitted ultrasound signals 85a with high enough frequencies, the larger the number of high-frequency transmitted ultrasound signals 85a that reach the microscopic defect 78 inside the test piece despite the effects of attenuation.

Since the first and second transducer elements 35a, 35b are very heavily-damped by means of the backing material 37a, 37b, the transmitted ultrasound signals have short pulse lengths. As a result, the transducer assembly 10 has very high resolution and is configured to distinguish between adjacent anomalies deep inside the test piece 78.

To further limit the effects of attenuation, the first and second transducer elements 35a, 35b are arranged closely together. By arranging the first and second transducer elements 35a, 35b as closely together as practicable, transmitted and diffracted ultrasound signals 85a, 85b need only travel short distances though the test piece 70, thus experiencing minimal attenuation. To this end, the first and second transducer elements 35a, 35b are housed within a common housing 15 of the transducer assembly 10 and have a maximum probe centre spacing (PCS), or separation, of approximately 50 mm. The PCS of first and second transducer elements 35a, 35b is defined as the lateral separation between the midpoints of the first and second transducer elements 35a, 35b. A PCS of the first and second transducer elements between approximately 5 mm and 50 mm is preferable, since crosstalk between the first and second transducer elements 35a, 35b is reduced and the signal to noise ratio is improved. A PCS of the first and second transducer elements between approximately 6 mm and 8 mm is considered optimal.

The transducer assembly 10 is further configured to detect microscopic defects at varying depths. Referring to FIG. 2, the roof angle θ of each of the first and second transducer elements 35a, 35b defines the angle between each of the first and second transducer elements 35a, 35b and the first surface 72 of the test piece 70. By adjusting the roof angle θ of the first and second transducer elements 35a, 35b, the focal depth of the transducer assembly 10 is adjusted.

By arranging the first and second transducer elements 35a, 35b with a substantially zero roof angle, as in FIG. 1 and FIG. 3, the transducer assembly 10 is configured with an infinite focal depth. By increasing the roof angle θ of the first and second transducer elements 35a, 35b, the transducer assembly 10 is configured with a smaller focal depth. The minimum possible focal depth of the transducer assembly 10 is approximately 25 mm, while the maximum possible roof angle for the first and second transducer elements 35a, 35b is approximately 10°. Since the roof angle for the first and second transducer elements 35a, 35b is relatively low, the transducer assembly 10 is configured to detect defects directly therebelow.

Given the arrangement of the first and second transducer elements 35a, 35b discussed above, the transducer assembly 10 is a highly-sensitive and high resolution ultrasonic probe with an adjustable focal depth which is configurable to detect microscopic defects at any useful depth in a test piece 70. The transducer assembly 10 may also be used to detect the location and size of microscopic anomaly clusters in the test piece 70, and hence give an indication of the extent to which any region of the test piece 70 is deficient.

The transducer assembly 10 may also be configured to identify the thickness of a test piece 70 such as pipe, by analysing ultrasound signals 88a, 88b which reflect off the second surface 75 of the test piece 70 back towards the transducer assembly 10.

A more in-depth overview of the transducer assembly 10 will now be provided, referring also to FIG. 3 which shows the transducer assembly 10 in more detail.

As stated above, the transducer assembly 10 comprises a common housing 15 which encloses both the first transducer element 35a and the second transducer element 35b. The housing 15 is rigid, and has a substantially cuboid shape that defines an internal volume 28. As a result, the transducer assembly 10 can beneficially be installed and manipulated by a user by using only one hand. Moreover, due to being small and compact, the transducer assembly 10 can access hard to reach locations for scanning.

The housing 15 comprises a baseless box 17 which is integrally formed from an ideally lightweight, ductile and corrosion-resistant material such as aluminium. The baseless box 17 comprises an upper wall 21 defining a ceiling of the baseless box, second and third opposing side walls 22, 23 extending perpendicularly from two opposing edges of the upper wall 21, and fourth and fifth opposing side walls 24, 25 extending perpendicularly from the other two opposing edges of the upper wall 21. The second and third opposing side walls 22, 23 each abut (and are substantially perpendicular to) the third and fourth opposing side walls 23, 24. The upper wall and the side walls 21, 22, 23, 24, 25 each have a substantially rectangular shape.

The housing 15 further comprises a base section 20, the base section 20 comprising a sound absorbing medium 30 (or sound barrier 30) and first and second wedge portions 32a, 32b. The sounds absorbing medium 30 is of substantially cuboid shape. Each of the first and second wedge portions 32a, 32b includes a substantially cuboid wedge base, 33a, 33b and a substantially cuboid upper step 34a, 34b, each wedge base, 33a, 33b being integrally formed with the corresponding upper step, 34a, 34b. Each wedge base 33a, 33b defines a platform for the respective upper step 34a, 34b.

The sound absorbing medium 30 is sandwiched between the first and second wedge portions 32a, 32b such that the wedge bases 33a, 33b are substantially flush with a base face 31 of the sound absorbing medium 30. The sound absorbing medium 30 is fixedly attached to an internal face 39a, 39b of each wedge portion 32a, 32b, each internal face 39a, 39b comprising a face of the respective wedge base 33a, 33b and a face of the respective upper step 34a, 34b of the wedge portions 32a, 32b. The first and second wedge portions 32a, 32b are each fixedly attached, or "paired", to the sound absorbing medium 30 by means of an adhesive such as cyanoacrylate. The sound absorbing medium 30 extends perpendicularly away from the wedge bases 33a, 33b.

The baseless box 17 is fixedly attached to the wedge bases 33a, 33b at the outer rim of the base section 20 by means of an adhesive such as cyanoacrylate such that the upper step 34a, 34b of each of the first and second wedge portions 32a, 32b and the sound absorbing medium 30 extend towards the upper wall 21 of the housing 15. The base section 20 is arranged such that the sound absorbing medium 30 abuts and extends between the fourth and fifth opposing side walls 24, 25. The sound absorbing medium 30 may abut the upper wall 21, so that the internal volume 28 is divided by the sound absorbing medium 30, or not. When the sound absorbing medium 30 does not abut the upper wall 21, less material of the sound absorbing medium 30 is required.

The sound absorbing medium 30 sonically separates the first transducer element 35a and the first wedge portion 32a (to which the first transducer element 35a is fixedly mounted on one side of the sound absorbing medium 30) from the second transducer element 35b and the second wedge portion 32b (to which the second transducer element 35b is fixedly mounted on the other side of the sound absorbing medium 30).

The first and second wedge portions 32a, 32b separate the first and second transducer elements 35a, 35b from the test piece 70 and are a medium through which ultrasonic signals 85a, 85b propagate as they travel from the first transducer element 35a into the test piece 70 and from the test piece 70 into the second transducer element 35b. The first and second wedge portions 32a, 32b are made of any suitable material such as crosslink polystyrene.

The sound absorbing medium 30 therefore mitigates the risk of the second transducer element 35b receiving ultrasound signals directly from the first transducer element 35a that have not been incident on the test piece 70. The sound absorbing medium 30 therefore reduces cross talk between the first and second transducer elements 35a, 35b and hence improves the signal to noise ratio. The sound absorbing medium 30 may be made of any suitable material such as cork.

The first and second transducer elements 35a, 35b each consist of a piezocomposite element typically comprising a piezoelectric material and an epoxy. These materials improve the signal to noise ratio of the transducer assembly. The central frequency of the elements 35a, 35b is between 5 MHz and 20 MHz, and optimally 10 MHz. At low frequencies, the transducer assembly 10 lacks sensitivity and resolution, while at very high frequencies the transmitted ultrasound signals 85a of the transducer assembly 10 are unlikely to penetrate through the grain structure of the test piece 70. Since the transducer assembly 10 is extremely heavily-damped, transducer elements 35a, 35b with a 10 MHz central frequency provide the optimum bandwidth for detecting microscopic defects in a test piece. The piezoelectric elements 35a, 35b each have a fully circular disc shape and have a diameter between 3 mm to 8 mm, optimally 6 mm. The size of the piezoelectric elements 35a, 35b ensures a sufficiently wide beam spread for full coverage of the test piece 70. There is a limit on how small the diameter of the elements can be as it is important to ensure the sound waves have sufficient energy to penetrate into the sample under test without suffering significant attenuation.

The first and second transducer elements 35a, 35b are fixedly attached to the wedge portions 32a, 32b by means of an adhesive such as cyanoacrylate. In fixing the first and second transducer elements 35a, 35b to the first and second wedge portions 32a, 32b by means of an adhesive, any damage to the first and second transducer elements 35a, 35b that arises due to soldering is avoided. This is particularly beneficial given the sensitivity of piezocomposite crystals to heat. Moreover, by avoiding sintering, no fashioning of dimples or cut-outs in the first and second wedge portions 32a, 32b are required.

As stated above, the focal depth of the transducer assembly 10 depends on the roof angle θ of the first and second transducer elements 35a, 35b. Since the first and second transducer elements 35a, 35b are substantially flat discs, to arrange the first and second transducer elements 35a, 35b at a roof angle θ the upper step 34a, 34b of each of the first and second wedge portions 32a, 32b must be shaped accordingly. Therefore by adjusting the roof angle of the first and second wedge portions 32a, 32b, the focal-depth of the transducer 10 is adjusted as necessary.

In addition to the roof angle θ of the first and second transducer elements 35a, 35b, the focal depth of the transducer assembly 10 also depends on the sound velocity of the material of the first and second wedge portions 32a, 32b. Hence, the transducer assembly 10 is configured with a required focal depth by both adjusting the roof angle of the first and second transducer elements 35a, 35b, i.e. the roof angle θ of the upper step 34a, 34b of each of the first and second wedge portions 32a, 32b, and the material of the first and second wedge portions 32a, 32b. The first and second wedge portions 32a, 32b may, for example, comprise cast acrylic and/or polyether ether ketone.

By adjusting the density and velocity of the material that is used for the first and second wedge portions 32a, 32b, the refraction angle at which transmitted ultrasound signals 85a refract into the test piece 70 and diffracted ultrasound signals refract out of the test piece 70 may also be changed. In doing so, ultrasound signals may be directed out of, and diffracted back into, the transducer at a required angle, thus allowing the transducer 10 to detect microscopic defects at locations other than directly below the transducer 10. This may be particularly useful if one is unable to position the transducer 10 directly above one part of the test piece 70. For example if one wants to survey for defects directly below a bolt (not shown) in a test piece 70, one can positon a transducer assembly 10 with a high refraction angle next to the bolt and survey for defects in the region of the pipe directly below the bolt. The refraction angle of the first and second wedge portions 32a, 32b may be between 0° and 70°.

The thickness of the wedge portions 32a, 32b is between approximately 3 mm and 8 mm and optimally approximately 4 mm. Since ultrasound signals attenuate through the wedge portions 32a, 32b, it is beneficial that the wedge portions 32a, 32b be as thin as possible. However, the wedge portions 32a, 32b must be thick enough to allow for wear and tear of the transducer assembly 10.

Turning now to the electrical components, the transducer assembly 10 further comprises an electrical connection means 40 comprising a first electrical connection point 40a and a second electrical connection point 40b which are configured to electrically couple the first transducer element 35a and the second transducer element 35b to the flaw detector 90. The first and second electrical connection points 40a, 40b may be any suitable electrical connection points including coaxial power connectors such as LEMO connectors or Bayonet Neill-Concelman (BNC) connectors.

Figure 4:
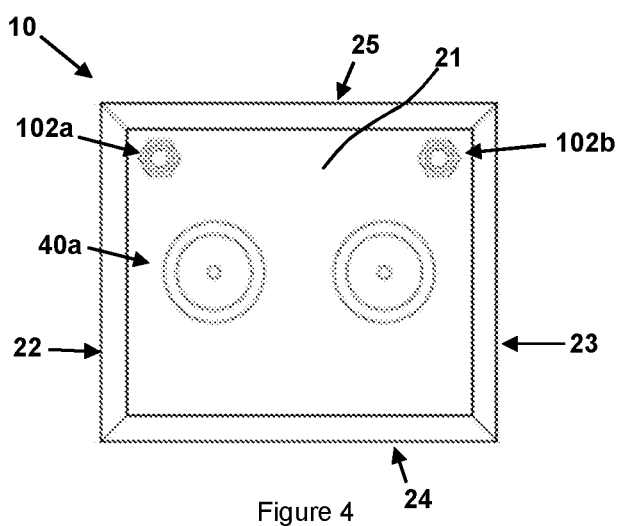
FIG. 4 is a top-down view of the transducer assembly in FIG. 1.

Referring to FIG. 4, the first and second electrical connection points 40a, 40b are securable in place in a first and second respective aperture of the upper wall 21 of the housing 15. The first and second electrical connection points 40a, 40b form a tight fit with each respective aperture.

The first electrical connection point 40a is coupled to the first transducer element 35a via a first electrical connector 50a while the second electrical connection point 40b is coupled to the second transducer element 35b via a second electrical connector 50b. The first and second electrical connectors 50a, 50b may be printed circuit boards (PCB) comprising a glass fibre reinforced (fibreglass) epoxy resin with copper foil bonded to one or two sides thereof. The first electrical connector 50a provides the first transducer element 35a with the electrical drive signal that is supplied by the flaw detector 90 at the first electrical connection point 40a. The second electrical connector 50b provides the flaw detector 90 with the electrical output signal supplied by the second transducer element 35b.

The first and second electrical connectors 50a, 50b are fixedly attached to the sound absorbing medium 30, one on each side, by means of an adhesive such as cyanoacrylate, the first electrical connector 50a facing the second wall 22 of the housing and the second electrical connector 50b facing the third wall 23 of the housing 15.

The first and second transducer elements 35a, 35b are coupled to the respective first and second electrical connectors 50a, 50b by means of strips 57a, 57b, 58a, 58b, typically made from silver. As mentioned above, the first and second transducer elements 35a, 35b are piezocomposite elements which are sensitive to heat. To avoid heating and hence damaging the first and second transducer elements 35a, 35b, silver strips 57a, 57b, 58a, 58b are used as they do not require soldering and can be adhered instead.

The silver strips 57a, 58a, 57b, 58b are coupled to the first and second respective transducer elements 35a, 35b at one end and to the first and second respective electrical connectors 50a, 50b at the other end. The silver strips 57a, 57b, 58a, 58b are fixedly attached to the first and second electrical connectors 50a, 50b by means of soldering. The silver strips 57a, 57b are fixedly attached to an upper surface of the first and second respective transducer elements 35a, 35b by means of electric paint, the upper surfaces facing the upper wall 21 of the housing. The silver strips 58a, 58b are fixedly attached to a lower surface of the first and second respective transducer elements 35a, 35b by means of electric paint, the lower surfaces facing the first and second respective wedge portions 32a, 32b. The silver strips 58a, 58b are arranged to run down side faces of the sound absorbing medium 30.

Instead of connecting the silver strips 57a, 57b, 58a, 58b to the first and second electrical connection points via the first and second respective electrical connectors 50a, 50b, the silver strips 57a, 57b, 58a, 58b may be directly attached to the first and second electrical connection points 40a, 40b.

However, given the delicateness of the silver strips 57a, 57b, 58a, 58b, it is prudent to avoid stretching when securing the silver strips 57a, 57b, 58a, 58b to the first and second electrical connection points 40a, 40b at one end and to the first and second transducer elements 35a, 35b at the other end during the construction of the transducer 10. Should the silver strips 57a, 57b, 58a, 58b stretch too much, they will snap. By connecting the silver strips 57a, 57b, 58a, 58b to the first and second electrical connection points via the first and second respective electrical connectors, it is less likely that the silver strips 57a, 57b, 58a, 58b will be damaged during the construction of the transducer 10. This method also conserves the costly silver strip material.

The first and second electrical connectors 50a, 50b are coupled to the first and second electrical connection points 40a, 40b by cables 52a, 52b, 55a, 55b such as coax cables. The cables 55a, 55b couple the first and second electrical connectors 50a, 50b to the tips 42a, 42b of the first and second respective electrical connection point 40a, 40b, while the cables 52a, 52b couple the first and second electrical connectors 50a, 50b to the first and second respective electrical connection points 40a, 40b elsewhere.

Referring back to FIGS. 1 and 3, the transducer assembly 10 may be connected to a traversing apparatus (not shown) which, when releasably connected to a test piece 70 such as pipe, allows the traversing apparatus to be moved across the first surface 72 of the test piece 70. In doing so, the transducer assembly 10 can smoothly and continuously scan any section of the test piece 70. Thus the position of the transducer assembly 10 on the test piece 70 may be adjusted as the traversing apparatus is moved across the test piece 70.

To this end, the transducer assembly 10 further comprises a traversing apparatus connection means 60, the traversing apparatus connection means 60 comprising two recesses, the first recess 60a and the second recess 60b. The first recess 60a is positioned in the second wall 22 while the second recess is positioned in third wall 23. Each recess 60a, 60b is configured to receive an engagement member (not shown) of the traversing apparatus, thereby releasably attaching traversing apparatus to the transducer assembly 10.

An encoder (not shown) is configured to record the position of the transducer assembly 10 and to send this information to the flaw detector 90 to be processed. The encoder may form part of the transducer assembly 10 or the traversing apparatus.

Figure 5:
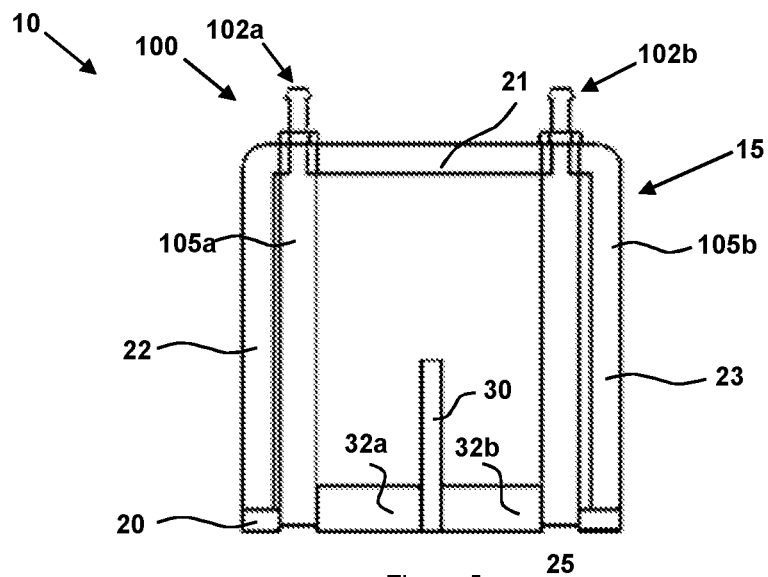
FIG. 5 is a cross-sectional view of the transducer assembly in FIG. 1.

Referring now to FIG. 5, the transducer assembly 10 further comprises a couplant distribution means 100. The couplant distribution means 100 is configured to distribute couplant through the transducer assembly 10 onto the test piece 70 so as to exclude any air between the first and second transducer elements 35a, 35b and the test piece 70, which would otherwise scatter the transmitted/received signals undesirably. Any such air affects the propagation of ultrasound signals 85a, 85b between the first and second transducer elements 35a, 35b and the test piece 70. The use of the couplant therefore ensures ultrasound energy is not lost as ultrasound signals propagate between the first and second transducer elements 35a, 35b and the test piece 70.

The couplant distribution means 100 comprises first and second couplant channels 105a, 105b which extend through the housing 15 and the first and second wedge portions 32a, 32b. The first and second couplant channels are configured to direct the couplant from the upper wall 21 of the housing 15 to the first and second respective wedge portions 32a, 32b and, hence, to the surface of the test piece 70.

The couplant distribution means 100 further comprises a first couplant connecting means 102a and a second couplant connecting means 102b. The first and second couplant connecting means 102a, 102b are configured to connect the couplant distribution means 100 to a couplant reserve (not shown). The first and second couplant connecting means 102a, 102b are secured to the first and second respective couplant channels 105a, 105b at the first and second respective couplant apertures in the upper wall 21 of the housing 25. The first and second couplant connecting means 102a, 102b are positioned away from the first and second electrical connection point 40a, 40b, as shown in FIG. 4.

Figure 6:
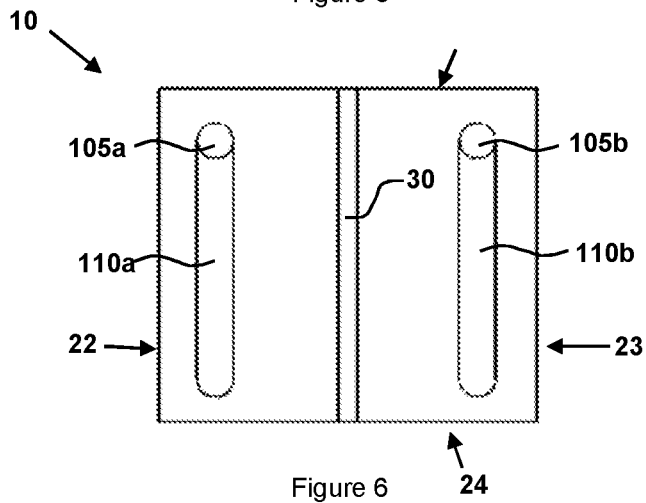
FIG. 6 is a bottom-up view of the transducer assembly in FIG. 1.

As shown in FIG. 6, the couplant distribution means 100 further comprises a first distribution groove 110a and a second distribution groove 110b. The first and second distribution grooves 110a, 110b are configured to direct the couplant from the first and second respective couplant channels 105a, 105b across the first surface 72 of the test piece 70. The first and second distribution grooves 110a, 110b are both etched into the lower surface of the wedge base 33a, 33b of first and second respective wedge portions 32a, 32b, the lower surface facing away from the upper wall 21 of the housing 15. The first and second distribution grooves 110a, 110b extend to the first and second couplant channels 105a, 105b.

The couplant is transported from the couplant reserve through the transducer assembly 10 and onto the test piece 70 as follows. First, the couplant distribution means 100 receives couplant from the couplant reserve via the first and second couplant connecting means 102a, 102b. The couplant may be driven by a pump (not shown) of the couplant reserve. The couplant then passes from the first and second couplant connecting means 102a, 102b through the first and second couplant channels 105a, 105b and onto the test piece 70. The first and second distribution grooves 110a, 110b then direct the couplant across the first surface 72 of the test piece 70.

Figure 7:
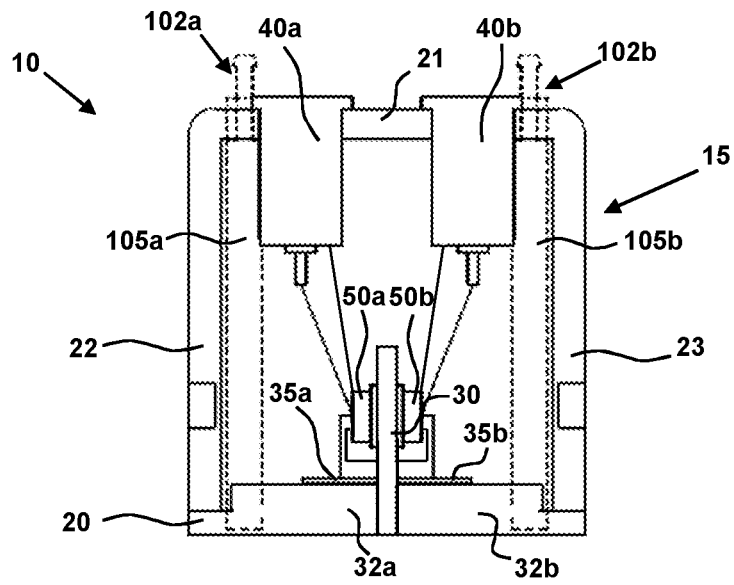
FIG. 7 is a cross-sectional view of the transducer assembly in FIG. 1.

FIG. 7 shows the couplant distribution means 100 with respect to the other components of the transducer assembly 10. The advantageous positioning of the first and second couplant channels 105a, 105b with respect to the other components of the transducer assembly 10 allows the dual element transducer assembly 10 to remain both small and connectable to the traversing apparatus. As a result, the transducer assembly 10 is "semi-automated" as it only requires manual guiding when connected to the traversing apparatus.

Due to the relatively simple arrangement of components as described above, the transducer assembly 10 is easily replicable and inexpensive.

Referring back to FIG. 1, the flaw detector 90 will now be described.

The flaw detector 90 drives the first transducer element 35a in transmitting ultrasonic signals 85a to the test piece 70 and analyses the diffracted ultrasonic signals 85b received by the second transducer element 35b with respect to the transmitted ultrasonic signals 85a using TOFD principles, to glean information about the microscopic defect 78 in the test piece 70.

The flaw detector 90 is configured to provide the transducer assembly 10 with the electrical drive signal via the first electrical connection point 40a. The flaw detector 90 is coupled to the first electrical connection point 40a by a first flaw detector coupling means 92a. Based on the electrical drive signal, the transducer assembly 10 causes the first transducer element 35a to transmit an ultrasonic signal 85a to the test piece 70.

The second transducer element 35b of the transducer assembly 10 receives the diffracted ultrasonic signals 85b.

The transducer assembly 10 converts a received diffracted ultrasonic signal 85b into an electrical output signal, and sends the electrical output signal to the flaw detector 90 via the second electrical connection point 40b for analysis. The flaw detector 90 is coupled to the second electrical connection point 40b by a second flaw detector coupling means 92b.

The flaw detector 90 is further configured to receive from the encoder (not shown) the relative position of the transducer assembly 10 on the test piece 70.

The flaw detector 90 analyses electrical output signals with respect to corresponding electrical drive signals at every location of the transducer assembly 10 on the test piece 70. By comparing the arrival times and amplitudes of diffracted ultrasonic signals 85b with respect to the transmitted ultrasonic signals 85a, the flaw detector 90 is able to construct a model of the integrity of the interior of the test piece 70. The flaw detector is further configured to filter out (high frequency) noise. The flaw detector may output this information as an image output so that the defect 78 in the test piece 70 may easily be examined. Beneficially, the short pulse lengths of the ultrasound signals improve the resolution of the image output.

Together, the transducer assembly 10 and the flaw detector 90 form a TOFD system 1.

It will be appreciated that many modifications may be made to the aforementioned embodiments without departing from the scope of the appended claims.

The invention claimed is:

1. A dual element time-of-flight diffraction (TOFD) transducer assembly for use in detecting a microscopic anomaly arising from high temperature hydrogen attack (HTHA) in a test piece, the transducer assembly comprising:
a first transducer element having a central frequency between 5MHz and 20MHz configured to transmit ultrasonic signals to the test piece, and a second transducer element having a central frequency between 5MHz and 20MHz configured to receive diffracted ultrasonic signals from the test piece, the first and second transducer elements each being arranged with a roof angle between 0° and 10°,
wherein the first and second transducer elements are housed within a common housing, the housing also forming part of the transducer assembly.

2. The transducer assembly of claim 1, wherein the transducer assembly comprises transducer elements, and wherein the transducer elements comprise only the first transducer element and the second transducer element and no other transducer element.

3. The transducer assembly of claim 1, wherein the first and second transducer elements each have a central frequency of 10 MHz.

4. The transducer assembly of claim 1, wherein the first and second transducer elements are damped, wherein the transducer assembly further comprises a backing material adhered to each of the first and second transducer elements, the backing material being configured to damp the first and second transducer elements.

5. The transducer assembly of claim 4, wherein the backing material comprises a tungsten-loaded adhesive.

6. The transducer assembly of claim 4, wherein between 25 70% and 90% of the backing material is tungsten powder by weight.

7. The transducer assembly of claim 1, wherein the backing material has a mass between 0.04 g and 0.06 g, and has an optimal mass of 0.05 g.

8. The transducer assembly of claim 1, wherein the first and second transducer elements have a maximum probe centre spacing (PCS) of 50 mm, and wherein the first and second transducer elements have a PCS between 5mm and 50mm.

9. The transducer assembly of claim 1, wherein the transducer assembly is configured with a focal depth of at least 10 mm.

10. The transducer assembly of claim 1, wherein the first and second transducer elements are each arranged with a roof angle of 0°.

11. The transducer assembly of claim 1, wherein the transducer assembly further comprises a first wedge portion and a second wedge portion for mounting the first and second transducer elements respectively.

12. The transducer assembly of claim 11, wherein the first and second wedge portions each have a thickness between 3mm and 8mm.

13. The transducer assembly of claim 11, wherein the first transducer element is fixedly attached to the first wedge portion and the second transducer element is fixedly attached to the second wedge portion by means of an adhesive.

14. The transducer assembly of claim 1, wherein the transducer assembly further comprises a sound absorbing medium positioned between the first and second transducer elements, the sound absorbing medium sonically separating the first and second transducer elements.

15. The transducer assembly of claim 14, wherein the sound absorbing medium is also positioned between the first and second wedge portions, the sound absorbing medium also sonically separating the first and second wedge portions.

16. The transducer assembly of claim 14, wherein the sound absorbing medium is substantially made of cork.

17. The transducer assembly of claim 1, wherein the transducer assembly further comprises an electrical connection means configured to electrically couple the first and second transducer elements to a flaw detector.

18. A TOFD system comprising the transducer assembly of claim 17 and a flaw detector, wherein the flaw detector is coupled to the first and second transducer elements at the electrical connection
means.

19. The transducer assembly of claim 1, wherein the transducer assembly further comprises a couplant distribution means configured to distribute couplant on the test piece.

20. The transducer assembly of claim 1, wherein the transducer assembly further comprises a traversing apparatus connection means configured to releasably attach the transducer assembly to a traversing apparatus.

21. The transducer assembly of claim 1, wherein the first and second transducer elements each consist of a piezocomposite element.

22. The transducer assembly of claim 1, wherein the first and second transducer elements each have a circular shape and have a diameter between 4mm and 8mm.

23. The TOFD system of claim 1, wherein the flaw detector is configured to:
provide the transducer assembly with electrical drive signals for conversion by the transducer assembly into the ultrasonic signals to be transmitted into the test piece,
receive electrical output signals derived from diffracted ultrasonic signals converted by the transducer assembly, analyse the received electrical output signals with respect to the electrical drive signals to determine the anomaly of the test piece, and output data relating to the anomaly of the test piece.

24. A method of detecting a microscopic anomaly in a test piece using the TOFD system of claim 1; the method comprising the steps of:

providing the TOFD system, arranging the transducer assembly of the TOFD system on the test piece above the anomaly, causing the flaw detector of the TOFD system to produce electrical drive signals and to provide the first transducer assembly with said electrical drive signals via the electrical connection means of the TOFD system, causing the transducer assembly to convert the electrical drive signals into ultrasonic signals and to transmit said ultrasonic signals into the test piece to diffract at the microscopic anomaly and propagate back towards the transducer assembly, causing the transducer assembly to convert diffracted ultrasonic signals into electrical output signals and to provide the flaw detector with said electrical output signals via the electrical connection means, causing the flaw detector to analyse the electrical output signals with respect to the electrical drive signals to determine the anomaly of the test piece, and causing the flaw detector to output data relating to the anomaly of the test piece.

\* \* \* \* \*